US011858267B2

(12) United States Patent
Specker

(10) Patent No.: US 11,858,267 B2
(45) Date of Patent: Jan. 2, 2024

(54) METHOD FOR OPERATING A CIJ PRINTER WITH OPTICAL MONITORING OF PRINTING QUALITY, CIJ PRINTER WITH OPTICAL MONITORING OF PRINTING QUALITY, AND METHOD FOR TEACHING-IN A CIJ PRINTER WITH OPTICAL MONITORING OF PRINTING QUALITY

(71) Applicant: PAUL LEIBINGER GMBH & CO. KG NUMMERIER-UND MARKIERUNGSSYSTEME, Tuttlingen (DE)

(72) Inventor: Klaus Specker, Neuhausen (DE)

(73) Assignee: PAUL LEIBINGER GMBH & CO. KG NUMMERIER-UND MARKIERUNGSSYSTEME, Tuttlingen (DE)

( * ) Notice: Subject to any disclaimer, the term of this patent is extended or adjusted under 35 U.S.C. 154(b) by 189 days.

(21) Appl. No.: 17/436,437

(22) PCT Filed: Dec. 10, 2019

(86) PCT No.: PCT/EP2019/084488
§ 371 (c)(1),
(2) Date: Sep. 3, 2021

(87) PCT Pub. No.: WO2020/177912
PCT Pub. Date: Sep. 10, 2020

(65) Prior Publication Data

US 2022/0169022 A1 Jun. 2, 2022

(30) Foreign Application Priority Data

Mar. 6, 2019 (EP) .................................... 19161144

(51) Int. Cl.
*B41J 2/12* (2006.01)
*B41J 2/075* (2006.01)
*B41J 2/125* (2006.01)

(52) U.S. Cl.
CPC ................ *B41J 2/12* (2013.01); *B41J 2/075* (2013.01); *B41J 2/125* (2013.01)

(58) Field of Classification Search
CPC ..... B41J 2/12; B41J 2/075; B41J 2/125; B41J 2002/022; B41J 2002/033
See application file for complete search history.

(56) References Cited

FOREIGN PATENT DOCUMENTS

| | | |
|---|---|---|
| JP | H07144461 A | 6/1995 |
| JP | H11198360 A | 7/1999 |

OTHER PUBLICATIONS

Office action dated Nov. 8, 2022, in parallel Japanese application No. 2021-552743.

*Primary Examiner* — Kristal Feggins
(74) *Attorney, Agent, or Firm* — Nath, Goldberg & Meyer; Jerald L. Meyer; Stanley N. Protigal

(57) ABSTRACT

Provided are a method for operating a CIJ printer with an optical monitoring means (80) having the steps of generating a bitmap (90,180) of the printed image to be printed, sequential controlling of charge electrodes (25) and/or deflection electrodes (30) of the CIJ printer, in order to generate dots or groups of dots of the bitmap (90,190) by applying ink droplets (12) to a substrate (100) to be printed and thus to sequentially apply a real printed image (195) to the substrate (100), capturing the real printed image (195) applied to the substrate (100) with the optical monitoring means (80), and automated comparing of the bitmap (90, 190) of the desired printed image and of the real printed image (195) which has been applied to the substrate (100) and has been captured with the optical monitoring means (80), wherein the bitmap (90,190) of the desired printed (Continued)

image and the real image applied to the substrate (100) are automatically compared either on the basis of rows or columns of the bitmap (90,190) or on the basis of components of rows or columns of the bitmap (90,190), a CIJ printer for carrying out such a method and a method for teaching-in an optical monitoring means (80) of such a CIJ printer.

12 Claims, 4 Drawing Sheets

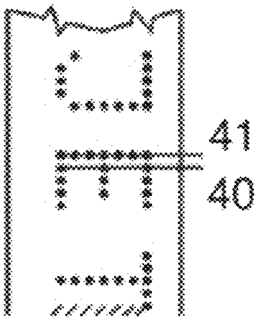
Fig. 1b
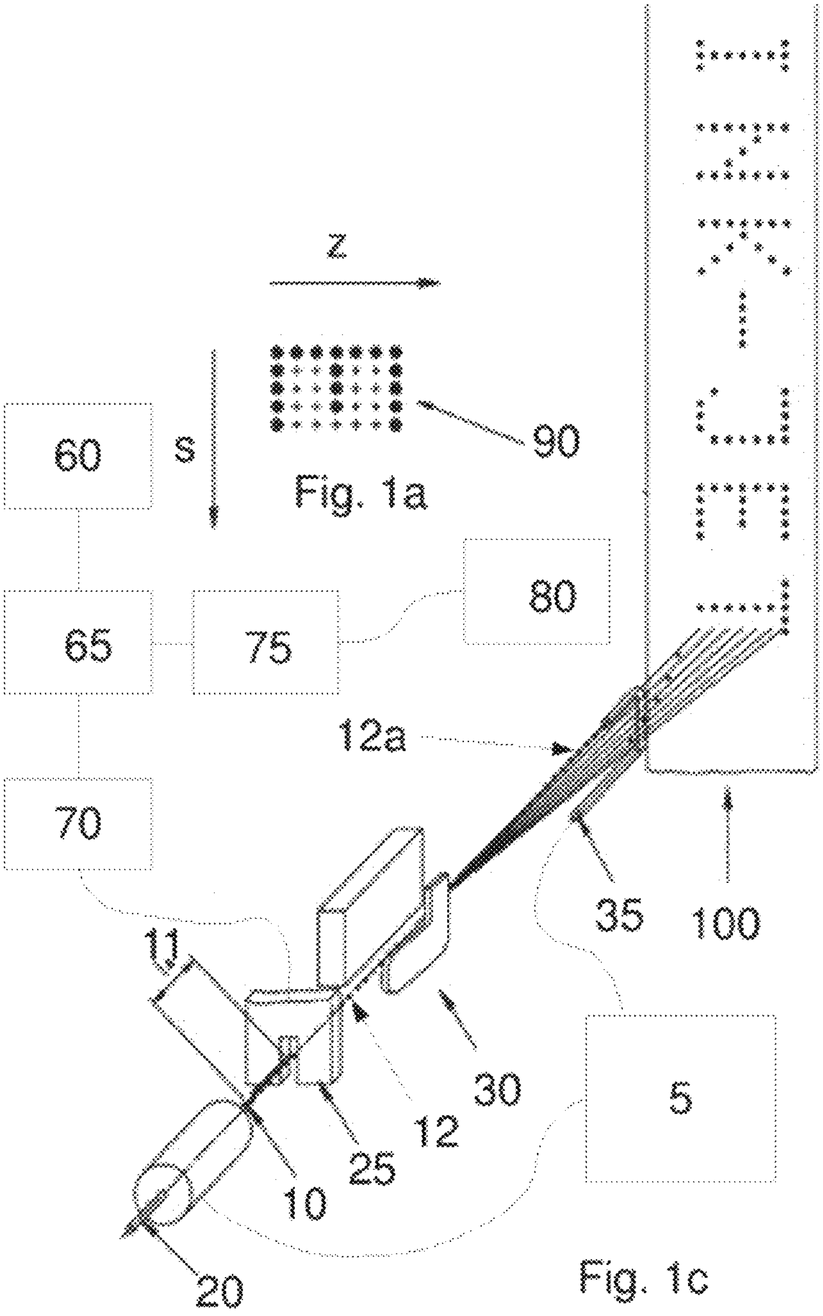
Fig. 1a
Fig. 1c
Fig. 1d

METHOD FOR OPERATING A CIJ PRINTER WITH OPTICAL MONITORING OF PRINTING QUALITY, CIJ PRINTER WITH OPTICAL MONITORING OF PRINTING QUALITY, AND METHOD FOR TEACHING-IN A CIJ PRINTER WITH OPTICAL MONITORING OF PRINTING QUALITY

CROSS-REFERENCE TO RELATED APPLICATIONS

This is a National Phase Application filed under 35 U.S.C. 371 as a national stage of PCT/EP2019/084488, filed Dec. 10, 2019, an application claiming the benefit of European Application No19161144.1, filed Mar. 6, 2019, the content of each of which is hereby incorporated by reference in its entirety.

FIELD

Inkjet printers are a widely used class of printers. A family of this class that is particularly suitable for industrial applications and has therefore achieved a high degree of popularity in this field are the so-called continuous inkjet printers (CIJ printers).

BACKGROUND

A continuous inkjet printer prints with an ink that contains a variable amount of solvent. Accordingly, there is a mixing tank where solvents from a solvent tank and the concentrated ink from an ink tank are mixed together to obtain the ink used for printing. When the term “ink” is used below, it means the liquid used for printing; the term “concentrated ink” is used for the liquid provided in the ink tank.

From the mixing tank, the ink is supplied under pressure to a nozzle on the print head, where the droplets required for the actual printing process are produced from the ink jet according to the basic principle of Rayleigh’s decay of laminar liquid jets. The droplet formation and in particular the droplet size is controlled by a modulation, which is, for example, impressed on the inkjet by piezo elements excited in a suitable manner.

The droplets produced in this way are electrically charged in a suitable manner and guided by deflection electrodes to a desired trajectory, which either leads them to a desired position of a substrate to be printed or, if no printing process is to be carried out at the moment, allows interception at the print head, for example at a catcher tube, and recycling of the ink droplet, i.e., its return to the mixing tank.

The element to be printed in each case, for example a letter or a number, is realized in this way by means of a matrix or bitmap of ink droplets, in many cases by a 7×5 matrix, for example, whereby, generally, one dimension, meaning, rows or columns of the matrix or bitmap, are realized by the deflection of the ink droplets and the other dimension is realized by a material feed of the material to be printed. As a rule, the CIJ printer therefore prints a sequence of so-called strokes, i.e., of rows of ink droplets arranged side by side; in its control unit, the character to be represented is converted into a matrix or bitmap corresponding to the resolution, which is then processed by row or by column.

Obviously, an essential goal is to ensure that by controlling the deflection electrodes the ink droplets land as reproducibly as possible at the correct location of the substrate to be printed, so that neither the printed image is distorted on a given substrate nor the position of the printed image on successively printed substrates is significantly changed. Such significant changes can potentially occur due to fluctuations in operating parameters, and it is desirable to detect them as quickly as possible to, on the one hand, produce the desired printed image again by adjusting the settings accordingly and, on the other hand, to be able to pull products bearing misprints out of the production line in good time.

A known way of approaching this goal is to carry out a camera monitoring of the printed image, the camera preferably being in signal communication with the CIJ printer, so that data collected by the camera and captured images can be displayed on a display of the CIJ printer.

Especially in systems that are optimized for printing speed, the time interval between two successive printing processes in which different copies of the product to be printed is often very short, so that the goal is to identify misprints as quickly as possible in order to keep the number of incorrectly printed products as low as possible.

Another significant difficulty in camera monitoring of the printed image is that, at least, if this is to take place automatically, a teach-in process must be carried out.

This teach-in process is complicated in particular by the fact that in the case of CIJ printers, at least when they are operated in an optimized manner in order to ensure the speed of printing, fluctuations in the position of individual droplets (i.e., dots of the printed image) occur depending on whether and/or where the previously generated droplet has been printed/deflected, for example. The result is that CIJ printers with a camera connection or camera integration do not represent true plug-and-play systems, but instead a complex commissioning procedure has to be carried out first, which might have to be carried out anew which each change of the printing conditions, for example of the material to be printed.

SUMMARY

It therefore is the object of the invention to improve CIJ printers with optical monitoring, in particular with regard to the reaction time during the monitoring and/or with regard to the time required for the teaching-in of the optical monitoring system.

This object is achieved by means of a method for operating a CIJ printer with an optical monitoring means in which a bitmap of the printed image to be printed is generating, and sequential controlling of charge electrodes and/or deflection electrodes of the CIJ printer is used to realize dots or groups of dots of the bitmap by applying ink droplets to a substrate to be printed, and by means of a CIJ printer with an optical monitoring means for carrying out such a method.

The method according to the invention for operating a CIJ printer having an optical monitoring means has at least the steps to be carried out in this order, but not necessarily immediately sequentially

- generating a bitmap of the desired printed image,
- sequential controlling of charge electrodes and/or deflection electrodes or deflection plates of the CIJ printer in order to realize dots or groups of dots of the bitmap by applying ink droplets to a substrate to be printed and thus to sequentially apply a real printed image to the substrate,
- capturing the real printed image applied to the substrate with the optical monitoring means, and automated comparing of the bitmap of the desired printed image and of the real printed image captured with the optical monitoring means applied to the substrate.

It is essential to the invention that the automated comparing of the bitmap of the desired printed image and the real printed image applied to the substrate is carried out on the basis of rows or columns of the printed image, which are usually formed by strokes, or on the basis of components of rows or columns of the printed image, meaning, the position of ink droplets.

This means, it is no longer verified after the entire bitmap, e.g., a letter to be printed or a number to be printed, is realized as a real printed image on the material to be printed, whether said realized bitmap corresponds to the desired printed image or the entire bitmap, but it is verified stroke by stroke, in particular, after each stroke or, where appropriate, even during the execution of the stroke, whether this stroke or the individual ink droplets of which it consists was/were correctly placed.

This approach has multiple advantages: The pattern to be recognized or checked is much simpler, making pattern recognition easier and more reliable and reducing their computing time requirements and hardware requirements. In addition, the verification rate is significantly increased, so that an error can be detected more quickly.

According to an advantageous embodiment of the method, it is provided that at least one control signal is used for the sequential control of charge electrodes and/or deflection electrodes of the CIJ printer during the automated comparison of the bitmap of the desired printed image and the printed image for example and captured with the optical monitoring means to determine the expected printed image of the respective row or column.

In a further development of the above-mentioned embodiment, it is provided that at least one further control signal for the sequential control of charge electrodes and/or deflection electrodes of the CIJ printer is used during the automated comparison of the bitmap of the desired printed image and the printed image applied to the substrate and captured with the optical monitoring means to determine the expected printed image of the respective row or column. What can be achieved in this way is an increase in the precision of the character comparison and, as a result, a greater sensitivity in the detection of emerging interfering effects that may lead to slight changes in the printed image of a given stroke, which changes may vary depending on the stroke executed previously, for example.

If the sequential control of the charge electrodes and/or deflection electrodes of the CIJ printer also takes place by row or column, this control signal can be used directly to define a target position for the monitoring.

It has proved to be particularly advantageous if the CIJ printer has a plurality of processors or a processor with a plurality of processor cores, wherein, on the one processor the bitmap of the desired printed image is generated and the generation of the control signals for the sequential control of charge electrodes and/or deflection electrodes of the CIJ printer is monitored, and on the other processor, the automated comparison of the bitmap of the desired printed image and the printed image applied to the substrate and captured with the optical monitoring means is detected. In this way, it can be ensured particularly well that the image processing does not have a negative effect on the actual print operation, even with high CPU power required.

The CIJ printer according to the invention for carrying out the method according to the invention comprises a hydraulic module for ink supply, a droplet generator comprising a nozzle and an oscillator for pressure modulation, which droplet generator is supplied with ink by the hydraulic module and generates ink droplets, at least one charge electrode for applying a defined charge to ink droplets generated by the droplet generator, at least one deflection electrode for influencing the trajectory of the ink droplets generated by the droplet generator, a control unit configured to transform a bitmap to be printed row by row or column by column into a sequence of control signals with which the charge electrode and/or the deflection electrode are controlled in such a way, that from droplets of a droplet sequence an image of this row or column is formed on a substrate to be printed, and an optical monitoring means, which may be designed in particular as a CCD camera, for monitoring the image formed on the substrate to be printed.

According to the disclosed technique, the CIJ printer has a data processing device which is configured to carry out the step of automated comparing of the bitmap.

According to a preferred development of the invention, it is provided that the CIJ printer has a first processor or a first processor core assigned to the control unit and has a second processor or processor core assigned to the data processing device. In this way, an undesired influence on the printing speed by the image analysis to be carried out can be avoided.

Furthermore, it is advantageous if the control is in signal communication with the data processing device, so that the respective sequences of control signals or control commands corresponding to these sequences are forwarded by the control unit to the data processing device. The former corresponds to an analog signal transmission, the latter to a digital signal transmission. Both In the method according to the invention for teaching-in an optical monitoring system of a CIJ printer having such an optical monitoring system, it is provided that the CIJ printer generates a bitmap in at least one run, which contains a sequence of control signals for controlling charge electrodes and/or deflection electrodes of the CIJ printer during the execution of a stroke, that a real printed image of this bitmap is realized by applying ink droplets to a substrate to be printed, that an image of the real printed image is captured with the optical monitoring means and evaluated such that the part of the real printed image applied to the substrate in each case in response to a control signal for a given stroke is identified and stored as the expected the printed image associated with the control signal. It is particularly advantageous if this sequence comprises all control signals; however, it can also be sufficient if it comprises only certain, distinctive control signals for strokes whose printed image shows specific expected deviations.

It should be pointed out that, in principle, this bitmap can also be generated stroke by stroke, i.e. that the CIJ printer sequentially generates all control signals for controlling charge electrodes and/or deflection electrodes of the CIJ printer in at least one run, in order to realize dots or groups of dots of the bitmap by applying ink droplets to a substrate to be printed, and that the printed image applied to the substrate in each case in response to the control signal is captured with the optical monitoring means and is stored as the printed image associated with the control signal.

In the first case, a more complex bitmap is formed from the possible or the selected "elementary strokes" and the image of this bitmap captured by the optical monitoring means is evaluated, while in the second case each stroke is individually executed and analyzed. The advantage of the first approach is that interactions between successive strokes can already be taken into account, but the evaluation in the second case may be simpler.

In both cases, aside from being stored as an image file, storage can also take place in the form of coordinates of camera pixels at which the signal of ink droplets is to be expected. In this way, a library of at least one image each, each of which is assigned to a stroke, is automatically created or a library of expected ink droplet positions at certain strokes is created.

The great advantage of this method of teaching-in is that an immediate and automatic assignment between the result of the print command and the print command is made possible, whereas until now, with teaching-in by a user, a more complex bitmap had to be classified after it was created with a plurality of strokes.

A further advantage is that systematic deviations can often be identified more easily at the individual stroke and, if necessary, corrected. For example, if the medium to be printed is fed at too high a speed, the stroke and the bitmaps composed thereof may tilt. Characteristic of this is that systematically, regardless of the concrete printed image of the stroke, an offset of the individual ink droplets occurs, which becomes larger the closer to the end of a stroke the droplet in question was produced.

In order to obtain a range of fluctuation for the droplet positions obtained, it is advantageous if the printer generates sequences of—preferably, but not necessarily, all—control signals for controlling charge electrodes and/or deflection electrodes of the CLI printer, in order to realize dots or groups of dots of the bitmap by applying ink droplets to a substrate to be printed, and if the printed image applied to the substrate in each case in response to the control signal is captured with the optical monitoring means and is stored as a printed image assigned to the control signal.

It should also be noted that the printed image and in particular the size of the individual droplets or droplets or the dot generated by a single droplet also depends on the ink used and the substrate.

In particular, when proceeding in that way, the differences in the printing position, which are caused by different preceding strokes in a given stroke, can be detected and used in the monitoring of the printing result. To this end, the printer is allowed to generate sequences of—preferably, but not necessarily, all—control signals for controlling charge electrodes and/or deflection electrodes of the CIJ printer in the plurality of passes, wherein the sequence of the control signals for controlling charge electrodes and/or deflection electrodes of the CIJ printer, is generated, is varied from sequence to sequence. In principle, it is also possible to do this for all possible combinations of strokes. In addition to a complete detection of the fluctuation margins of the individual droplet positions, which can then be used for monitoring of the success of the printing process, there is also the possibility in this case of taking into account, for example, the stroke printed prior to the stroke to be printed and thereby increasing the precision of the position information during the monitoring of the printed image.

The analysis possibilities that can be created with the data obtained in the teach-in routine can be increased even further if, in the plurality of passes, the printer varies print parameters that may fluctuate during the printing operation of the CIJ printer and lead to a change in the printed image. For example, the viscosity of the ink can fluctuate during operation, which can lead to a change in the printed image. By deliberately changing this parameter in a teach-in phase, the effects thereof can be captured and used on the one hand to improve the monitoring of the success of the printing process, but on the other hand also for the early detection of an impending malfunction.

BRIEF DESCRIPTION OF THE DRAWINGS

The invention is explained in more detail below on the basis of FIGS. representing exemplary embodiments. In the drawings:

FIG. 1*a* shows a schematic representation of a character to be printed,

FIG. 1*b* shows a schematic representation of the breakdown of the printing process into individual strokes, FIG. 1*c* shows a schematic representation of the writing of a stroke on the substrate by the CIJ printer, FIG. 1*d* shows an example of a complex bitmap that can be created by the user.

DETAILED DESCRIPTION

Figure 2A:
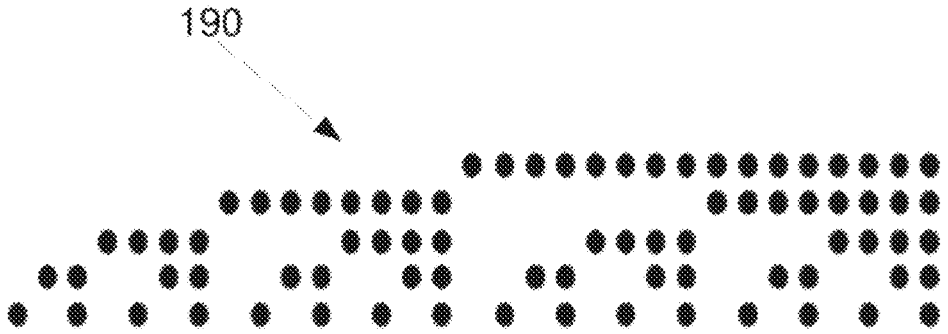
FIG. 2*a* shows an example of a bitmap to be printed, which can also be used for teaching-in the camera.

First, the operating principle of a CIJ printer will be explained schematically based on FIGS. 1*a* to 1*d*. The characters to be printed are each defined as a group of dots on a matrix, with the dots then created by ink droplets. This can be represented as bitmap 90 for machine processing.

In FIG. 1*a*, the letter "E" on a 7×5 matrix 1 is shown as a simple example of such a bitmap 90. In reality, however, today a CIJ printer can usually illustrate more dots in one row, e.g. 32 dots, which allows the user to compile complex contents, as shown by way of example in FIG. 1*d*, as a desired printed image, which is then converted into the corresponding bitmap and processed.

When such a bitmap 90 is printed, one dimension of the matrix on which it is based, in the orientation of FIG. 1*a* the direction z of the rows, is realized by a different deflection of the ink droplets, while the other dimension, in the orientation of FIG. 1*a*, the direction s columns, is realized by a movement of the material to be printed. In particular, in the case of a different orientation, the role of the rows and columns can of course be reversed.

FIG. 1*c* shows schematically how the production and deflection of the ink droplets is realized by the CU printer. The ink is provided with defined properties, in particular defined pressure and defined viscosity, by a hydraulic module 5 shown only schematically in FIG. 1*c* and is supplied to the ink channel of the nozzle 10, which cannot be seen in FIG. 1*c*. The ink column in the ink channel of the nozzle 10 is modulated by means of an oscillator 20, which can be designed, for example, as a piezo actuator. With suitably selected jet conditions, which theoretically were derived from C. Weber in the journal of applied mathematics and mechanics, volume 11, 1931, constrictions are formed after exiting the nozzle 10, until there is a splatter-free separation of ink droplets 12 at tear-off point 11, which form an ink droplet jet. Typically, the ink droplets 12 of a jet that meets these conditions propagate at a speed of 20 m/s to 30 m/s, and high five-digit and even six-digit numbers of ink droplets 12 can be produced per second today.

After the separation of an ink droplet 12, it is provided with a target charge on the charge electrode 25, wherein the success of the charging process can be checked with a detector electrode, which is not recognizable in FIG. 1*c*, and is deflected at an energized deflection plate or deflection electrode 30 to different degrees depending on the charge, so that, as is shown by way of example in FIG. 1*c*, the charged ink droplets 12, when they hit the substrate 100 to be printed, land at a more or less well-defined position, at the present orientation row position, of the matrix defining the character, while unused ink droplets 12*a*, that are not charged, continue to fly into the catcher tube 35 and are returned to the ink mixing tank (not shown) in the hydraulic module 5.

The charge electrode 25 is controlled by a control unit, which converts a printed image which is produced directly or indirectly in a memory 60 by a user into a bitmap 90 in a grid image processor 65, and forwards the information about the rows or columns to be printed to a charging voltage computer 70 on the one hand, which is preferably designed as a separate processor. The charging voltage computer 70 generates a corresponding charging signal according to the calculated charge to be applied and passes it on as a control signal to the charge electrode 25.

The fact that the substrate 100 to be printed is moved makes it necessary, in particular if the printing speed is to be maximized, to print the rows (or columns) produced by different deflections of the droplets 12 as quickly as possible, since otherwise these are no longer on one row. Therefore, these are each processed by the CIJ printer as a common "stroke" 40, 41, as illustrated in FIG. 1*b*.

Figure 3:
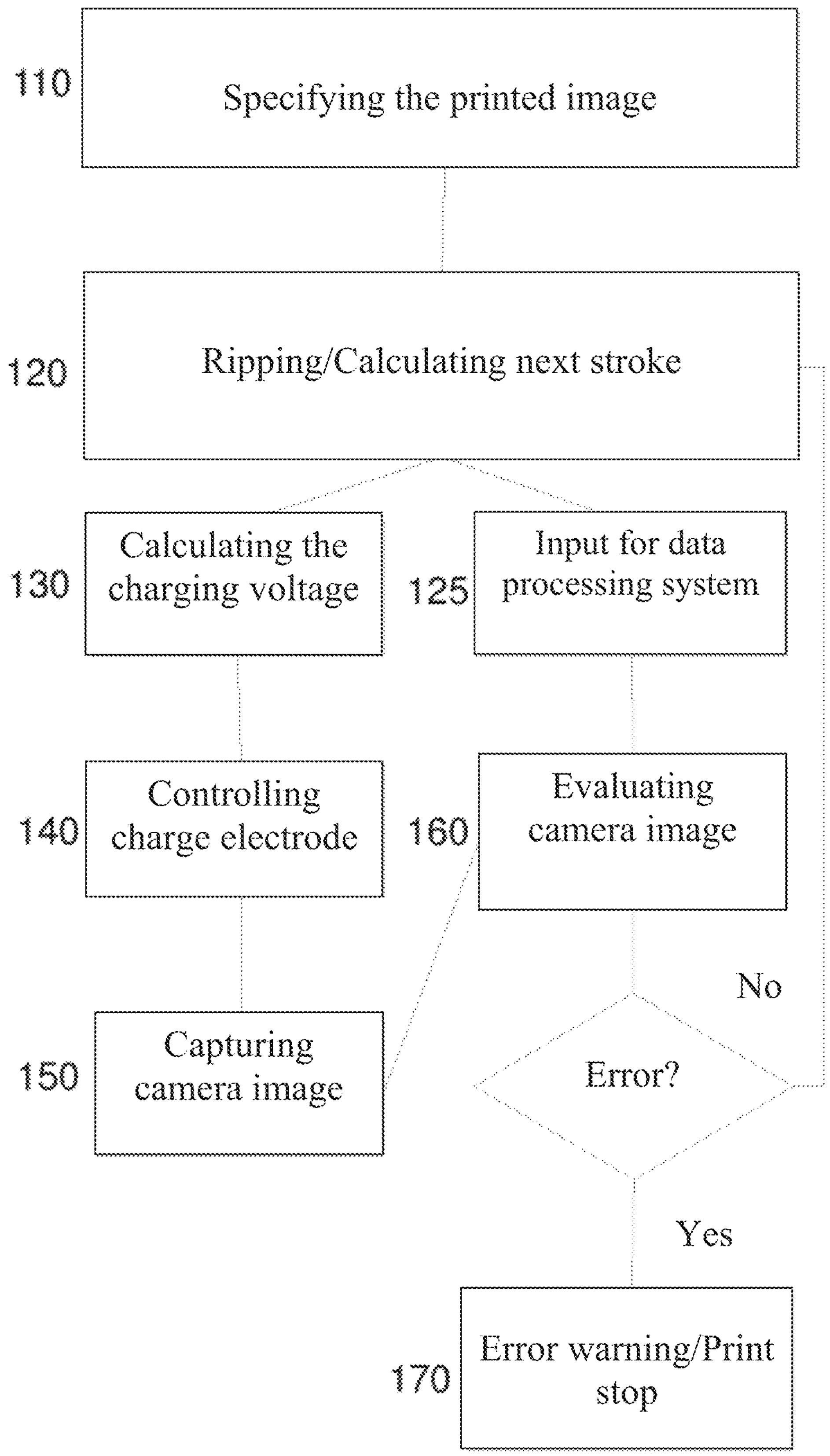
FIG. 3 shows a schematic flowchart of an exemplary procedure.

Specifically, the processing, as shown in FIG. 3 in the form of a schematic flow diagram, is accomplished in the CIJ printer in that a printed image predefined by the user in step 110, which, if it contains a counter information, for example, can change between printing processes to be carried out directly one after the other and is stored or cached in the memory 60, the bitmap 90 to be printed is obtained on a processor or processor core, the Raster Image Processor (RIP) 65, in a process referred to as ripping 120 and in particular the respective dot sequence, the current stroke 40, 41, to be imaged next by the CIJ printer, is determined, which indicates, at which locations of the substrate 100 ink droplets 12 are to be applied in order to generate dots.

It is important for the invention that at this point there is already at least implicit information about the expected printed image, which is configured according to the invention as a target specification for success monitoring.

This information is then, on the one hand, in step 125 forwarded as input to the data processing system 75, which is here implemented with a separate processor, which carries out the comparison between the signal to be printed and an image of the printing carried out, which images is forwarded from the optical monitoring means 80, which here is executed as a CCD camera, to the data processing system 75.

On the other hand, the information is further processed by the charging voltage computer 70. The charging voltage computer 70 calculates from said information—preferably taking into account the information which stroke or which strokes were printed shortly before and, if applicable, also already which stroke or which strokes are printed immediately afterwards—in step 130, the charging voltage which has to be applied to the droplets associated with the stroke so that they land at the desired location of the substrate so that said charging voltage can be applied to the charge electrode 25 during flyby.

These calculations are particularly complex because, on the one hand, space charges and, on the other hand, aerodynamic effects such as the slipstream of other droplets can significantly influence the trajectory of the ink droplets and their point of impact on the substrate. Therefore, the process step 130 is also preferably carried out on a separate processor or processor core.

The charging voltage obtained in this way is then used to control the charge electrode 25 in step 140 during the execution of the actual printing process and charges droplets 12 of the continuous ink droplet stream so that said ink droplets are deflected by the deflection voltage applied to the deflection plate 30 from the stream of the uncharged ink droplets 12*a* traveling to the catcher tube 35 and are applied to the substrate 100.

In order to define the start time of the printing process for a printed image to be applied and to enable its timing, a "print GO" signal is generated, e.g. when an object to be printed, which passes through the CIJ printer and is to be printed while passing through, reaches a defined position relative to the CIJ printer. This then triggers the printing—possibly after an adjusted waiting time—starting with the first stroke 40, 41; it may be useful to wait for a prespecifiable waiting time between successive strokes 40, 41.

For checking and monitoring the printing process, a camera image is captured at step 150, preferably with an optical monitoring means 80 here designed as a CCD camera. This can be triggered, for example using the print go signal as a time frame of reference. The image data of the camera image are then forwarded to a data processing system 75 and evaluated in step 160.

While this evaluation in the state of the art is usually carried out as an evaluation of the entire print on the object in comparison with the bitmap 90 to be printed according to the invention, this is done by an evaluation of the individual rows or columns of the printed image, each formed by a stroke 40, 41. It should be pointed out explicitly that this is not already the case automatically if the individual cells of the CCD chip of the optical monitoring means 80, which is here designed as a CCD camera, are read out row by row or column by column during an image evaluation and the corresponding data are then processed further, which is not an evaluation of rows or columns of the printed image but an evaluation of rows or columns of the camera image. However, this cannot provide the same results for the reason alone that it would be unsatisfactory for the attainable accuracy of the resolution if an ink droplet on the substrate would correspond only to a set pixel in the camera image.

If the evaluation in step 160 shows indications of a malfunction or a printing error, an error warning or a printing stop can be triggered in step 170. Otherwise, the processing can be continued by returning to step 120, especially if the next stroke 40, 41 has not yet been calculated. However, in the return to step 120, it is also possible to read out an already calculated further stroke from a local memory, which is preferably managed according to the FIFO principle.

Figure 2B:
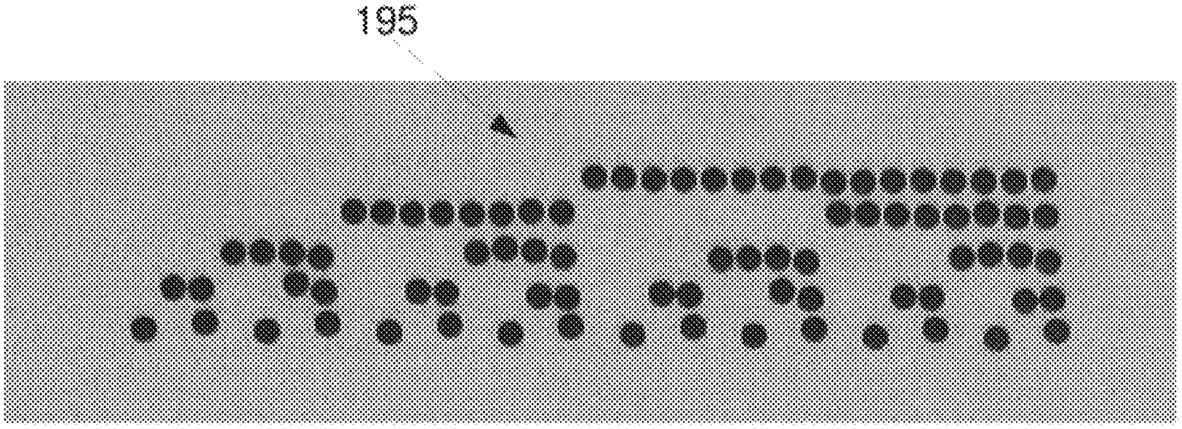
FIG. 2*b* shows the printing result captured with the camera obtained during printing of the bitmap of FIG. 2*a*.

In order to understand even more precisely the advantages of the procedure resulting from such a row- or column-based evaluation, an example of a bitmap 190 to be printed and the corresponding printed image 195 shown in FIG. 2*b*, as it is captured by the optical monitoring means 80, executed here as a CCD camera, is discussed here with reference to FIG. 2*a*. The imaging of an ink droplet 12 in the printed image 195 captured by the optical monitoring means 80, executed here as a CCD camera, typically comprises between 10 and 20 pixels; the exact value of course dependents on the resolution of the respective optical monitoring means 80 used and its geometric arrangement relative to the substrate 100 to be printed.

The bitmap 190 shown in FIG. 2*a*, which in particular can also be used for a teach-in process according to the invention, is formed by a sequence of all dots or ink droplet combinations that can be written with a five-dot stroke 40, 41, i.e., all possible strokes 40, 41 that are executed by a printer that writes five droplets wide.

When comparing the two FIGS. 2*a* and 2*b* with one another, a number of systematic deviations of the real printed image 195 according to FIG. 2*b* from bitmap 190 according to FIG. 2*a* can be clearly seen.

For example, one can immediately see a slight tilting of the individual strokes 40, 41 to the left, so that the uppermost droplet of a stroke 40, 41 in each case is the droplet of the stroke 40, 41 arranged furthest left on the substrate. This effect is related to the speed at which the substrate 100 is moved.

In addition, however, it can also be seen that the position of the individual rows changes, in particular depending on whether an adjacent droplet is present or not. This effect can be particularly clearly seen in the top row when comparing the group of droplets belonging to this group of droplets of the last eight strokes 40, 41 with the group belonging to this group of droplets of the ninth to sixteenth last stroke 40, 41, which are offset upwards as compared to the first group, but said effect clearly also results from the height offset of the droplets that belong to the last row.

A further deviation from the ideal image, which is specified by the bitmap 190 of FIG. 2*a*, in the generated printed image 195 as captured by the optical monitoring means 80 according to FIG. 2*b*, consists in that adjacent ink droplets can converge. For example, this can be seen in some of the droplet pairs that can be seen in the second-lowest row of FIG. 2*b*, for example, in the fifth and eighth droplet pairs of this row.

These respective deviations are not an indication of an interference effect, but also occur with printing that occurs without interference. In the previously customary comparison of the entire printed image 195 with the bitmap 190 to be printed, deviations are accordingly taken into account that are actually not caused by any newly occurring printing errors.

Instead, when using the teaching according to the invention, the printed images of the individual strokes 40, 41 captured by the optical monitoring means 80 can be used as the desired image which should be produced in response to the printing command for this stroke 40, 41, which leads to a very rapid evaluation. Firstly, it is not necessary to wait until the entire bitmap 190 is printed in order to then compare it with the printed result, but the comparison is possible immediately after the execution of a stroke 40, 41.

With the image evaluation, it is not only advantageous that the corresponding objects to be compared with one another are much smaller, but also that one knows in advance where to look for dots of the currently printed stroke 40, 41 on the CCD chip of the optical monitoring means 80, because, on the one hand, from a camera image such as that shown in FIG. 2*b* the ink droplet positions in the y-direction characteristic of a stroke 40, 41 can be derived and, on the other hand, the offset in the x-direction between adjacent strokes 40, 41.

This allows a very targeted comparison algorithm, in which the search for the printed ink droplet can begin immediately in the correct area of the CCD chip and an expected position of the ink droplet image can be specified with a relatively high degree of certainty.

If deviations between such expected positions and the positions at which the corresponding ink droplets of the respective stroke 40, 41 are then found in the camera image are systematically logged, then changes that are gradually emerging and in the long-term require corrections to print parameters such as changes in ink viscosity or in the proportions of concentrated ink and solvent, can potentially be derived at an early stage from the corresponding changes in the printed image and then corrected by initiating appropriate countermeasures before any malfunctions or misprints occur.

Figure 4:
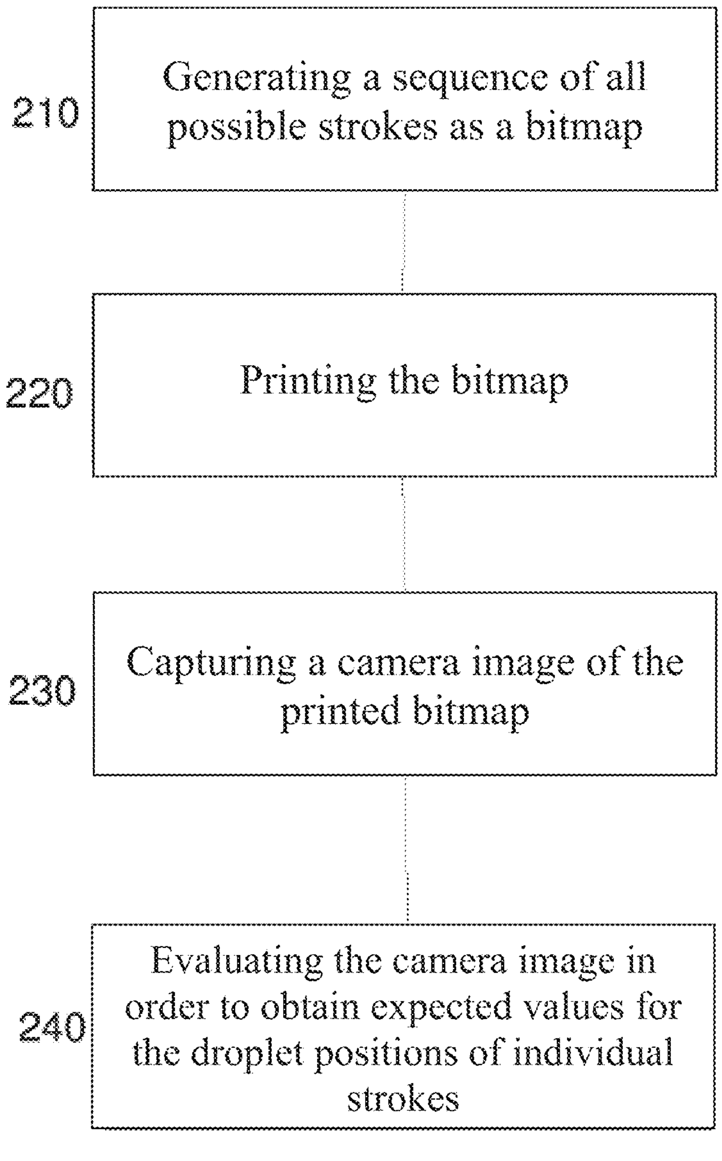
FIG. 4 shows a schematic flowchart of an exemplary teach-in process.

In addition, the stroke-based approach enables an extremely simple teach-in process which may ultimately even make it possible to operate an optical monitoring means 80 on a CU printer as a true plug-and-play module and which teach-in process is shown schematically in FIG. 4. In order to teach-in an optical monitoring means 80 after installation, it is, in step 210, only necessary to generate at least one defined sequence of all strokes 40, 41, i.e. all possible combinations of written ink droplet positions in a stroke 40, 41, as a bitmap and to print this sequence on the substrate 100 in step 220 under the operation conditions to be used later.

This printed image is then captured in step 230 with the optical monitoring means 80, which is designed as a camera, and at least one corresponding camera image is evaluated in step 240, preferably in order to obtain expected values for ink droplet positions of the individual strokes 40, 41.

Specifically, for example, each stroke 40, 41 or a control signal corresponding to this stroke 40, 41 is assigned or logically connected to the position of the ink droplets 12 on the CCD chip of the optical monitoring means (80), which is executed as a camera, in a y-direction, which corresponds to the deflection direction of the ink droplets 12, as expected ink droplet positions. On the other hand, by analyzing the distance between the images of the individual strokes 40, 41 on the CCD chip of the optical monitoring means 80, which is designed as a camera, information is obtained, at which x-positions on the CCD chip of the optical monitoring is to be expected by means of 80 ink droplets of an n-th stroke 40, 41 of a predetermined sequence of strokes 40, 41.

If a bitmap 90, 190 is then printed after the teach-in process in real operation, the output of the ripper 65 representing a specific stroke 40, 41 may be directly forwarded, if applicable, together with information about which stroke 40, 41 for writing this bitmap 90, 190 it is, as input for the data processing device 75 that analyzes the camera image.

This input can then be converted directly into a set of expected pixel positions for the ink droplets 12 associated with this stroke 40, 41 and it can be checked whether the corresponding pixels are set in the camera image. Even if the droplet position has moved slightly, quickly locating the newly added droplets 12 is ensured in this way, and by analyzing deviations it is possible to determine, on the one hand, whether the imprint is still acceptable or not by a comparison with the acceptance ranges to be determined, while, on the other hand, indications of the problems at hand that cause a deviation from the target position may already be obtained.

LIST OF REFERENCE NUMBERS

5 Hydraulic module
10 Nozzle
11 Tear-off point
12 Ink droplet
12*a* Uncharged ink droplet
20 Oscillator
25 Charge electrode

30 Deflection plate
35 Catcher tube
40, 41 Stroke
65 Raster Image Processor (Ripper)
70 Charging voltage computer
75 Data processing system
80 Optical monitoring means
90 Bitmap
100 Substrate
110 Specifying a printed image
120 Ripping
125 Forwarding input to data processing system
130 Calculating the charging voltage
140 Controlling the charge electrode
150 Capturing a camera image
160 Evaluating the camera image
170 Error warning
190 Bitmap
195 Printed image
210 Generating a sequence of all possible strokes as a bitmap
220 Printing the bitmap
230 Capturing a camera image
240 Evaluating the camera image
s Direction of the columns
z Direction of the rows

The invention claimed is:

1. A method for operating a continuous inkjet (CIJ) printer with an optical monitoring means (80) having the steps generating a bitmap (90, 180) of the printed image to be printed, sequential controlling of charge electrodes (25) and/or deflection electrodes (30) of the CIJ printer to realize columns or lines of the bitmap (90, 190) by applying rows of ink droplets (12) arranged side by side that each form a stroke (40, 41) to a substrate to be printed (100) and to thus sequentially apply a real printed image (195) on the substrate (100), capturing the real printed image (195) applied to the substrate (100) with the optical monitoring means (80), and automated comparing of the bitmap (90, 190) of the desired printed image and the real printed image (195) applied to the substrate (100) and captured with the optical monitoring means (80), characterized in that the automated comparing of the bitmap (90, 190) of the desired printed image and the real printed image (195) applied to the substrate (100) is carried out either on the basis of rows or columns of the bitmap (90, 190) or on the basis of components of rows or columns of the bitmap (90, 190), so as to verify, after each stroke (40, 41) or during the execution of the stroke (40, 41), whether the individual ink droplets (12) or which the stroke (40, 41) consists were laced correctly after each stroke (40, 41) or during the execution of the stroke (40, 41), in order to establish whether the individual ink droplets (12) of which the stroke consists were placed correctly and reduce the number of incorrectly printed products.

2. The method according to claim 1, characterized in that at least one control signal for the sequential controlling of charge electrodes (25) and/or deflection electrodes (30) of the CIJ printer is used in the automated comparing of the bitmap (90, 190) of the desired printed image and the real image (195) applied to the substrate (100) and captured by the optical monitoring means (80) to determine the expected printed image of the respective row or column.

3. The method according to claim 2, characterized in that at least one further control signal for the sequential controlling of charge electrodes (25) and/or deflection electrodes (30) of the CIJ printer in the automated comparing of the bitmap (90, 190) of the desired printed image and real printed image (195) applied to the substrate (100) and captured by the optical monitoring means (80) to determine the expected printed image of the respective row or column of the bitmap (90, 190).

4. The method according to claim 1, characterized in that the sequential controlling of charge electrodes (25) and/or deflection electrodes (30) of the CIJ printer also takes place row by row or column by column.

5. The method according to claim 1, characterized in that the CIJ printer has a plurality of processors or a processor with a plurality of processor cores, wherein on the one processor the bitmap (90, 190) of the desired printed image is generated and the generating of the control signals for the sequential controlling of the charge electrodes (25) and/or deflection electrodes (30) of the CIJ printer is monitored, and wherein on the other processor the automated comparing of the bitmap (90, 190) of the desired printed image and the real printed image (195) applied to the substrate (100) and captured by the optical monitoring means (80) is carried out.

6. A CIJ printer for carrying out a method according to claim 1, having a hydraulic module (5) for ink supply, a droplet generator having a nozzle (10) and an oscillator (20), which droplet generator is supplied with ink by the hydraulic module (5) and generates ink droplets (12), at least one charge electrode (25) for applying a defined charge to ink droplets (12) generated by the droplet generator, at least one deflection electrode (30) for influencing the trajectory of the ink droplets (12) generated by the droplet generator and charged by the charge electrode (25), a control configured to transform a bitmap to be printed (90, 190) by row or by column into a sequence of control signals with which the charge electrode (25) and/or the deflection electrode (30) are controlled in such a way that an image of that row or column is formed on a substrate to be printed (100) from droplets (12) of a droplet sequence, and an optical monitoring means (80) for monitoring the real printed image (195) formed on the substrate (100) to be printed, characterized in that the CIJ printer has a data processing device configured to carry out the step of the automated comparing.

7. The CIJ printer according to claim 6, characterized in that the CIJ printer has a first processor or a first processor core associated with the control and has a second processor or processor core associated with the data processing device.

8. The CIJ printer according to claim 6, characterized in that the control is in signal communication with the data processing device, so that the respective sequences of control signals or control commands corresponding to these sequences are forwarded by the control to the data processing device.

9. A method for teaching-in an optical monitoring means (80) of a CIJ printer according to claim 6, characterized in that the CIJ printer in at least one pass generates a bitmap (90, 190) containing a sequence of control signals for controlling charge electrodes (25) and/or deflection electrodes (30) of the CIJ printer when executing a stroke (40, 41), that a real printed image (195) of this bitmap (90, 190) is realized by applying ink droplets to a substrate (100) to be printed, that an image of the real printed image (195) is captured with the optical monitoring means (80) and evaluated such that the respective part of the real printed image (195) applied to the substrate (100) in response to a control signal for a given stroke (40, 41) is identified and is stored as the expected printed image associated with this stroke (40, 41) or this control signal.

10. The method according to claim 9, characterized in that the printer prints in a plurality of passes a bitmap (90, 190) containing a sequence of control signals for controlling charge electrodes (25) and/or deflection electrodes (30) of the CIJ printer to turn dots or groups of dots of the bitmap (90, 190) into a real printed image by applying ink droplets (12) to a substrate (100) to be printed, and that the printed image applied to the substrate in each case in response to the control signal is captured and identified by means of the optical monitoring means and is stored as a printed image associated with the control signal.

11. The method according to claim 10, characterized in that the printer generates in each of the plurality of passes a sequence of control signals for controlling charge electrodes (25) and/or deflection electrodes (30) of the CIJ printer, wherein the order in which the control signals for controlling charge electrodes (25) and/or deflection electrodes of the CIJ printer (30) are generated, varies from sequence to sequence.

12. The method according to claim 10, characterized in that the printer generates in each of the plurality of passes a sequence of control signals for controlling charge electrodes (25) and/or deflection electrodes (30) of the CIJ printer, wherein in the different passes printing parameters are varied that may fluctuate in the printing operation of the CIJ printer and lead to a change in the printed image (195).

* * * * *